United States Patent
Müller et al.

(10) Patent No.: US 9,199,297 B2
(45) Date of Patent: Dec. 1, 2015

(54) DRIVE DEVICE FOR MULTIAXIAL TRANSPORT OF WORKPIECES THROUGH SUCCESSIVE MACHINING STATIONS OF A MACHINE TOOL WITH PARALLELOGRAM GUIDES

(71) Applicant: SCHULER PRESSEN GMBH, Göppingen (DE)

(72) Inventors: Christian Müller, Mengen-Ennetach (DE); Anton Lendler, Weingarten (DE)

(73) Assignee: Schuler Pressen GmbH, Goppingen (DE)

(*) Notice: Subject to any disclaimer, the term of this patent is extended or adjusted under 35 U.S.C. 154(b) by 0 days.

(21) Appl. No.: 14/258,387

(22) Filed: Apr. 22, 2014

(65) Prior Publication Data

US 2014/0227065 A1 Aug. 14, 2014

Related U.S. Application Data

(63) Continuation of application No. PCT/EP2012/003428, filed on Aug. 10, 2012.

(30) Foreign Application Priority Data

Nov. 11, 2011 (DE) .......................... 10 2011 118 216

(51) Int. Cl.
| | | |
|---|---|---|
| *B21D 43/05* | (2006.01) | |
| *B21D 43/00* | (2006.01) | |
| *B25J 9/10* | (2006.01) | |

(52) U.S. Cl.
CPC .............. *B21D 43/00* (2013.01); *B21D 43/055* (2013.01); *B25J 9/1065* (2013.01)

(58) Field of Classification Search
CPC ...... B21D 43/05; B25J 9/0048; B25J 9/0084; B25J 9/1065; B25J 9/1623; B65G 37/005; B66F 7/0641; B66F 3/46
See application file for complete search history.

(56) References Cited

U.S. PATENT DOCUMENTS 2,766,007 A * 10/1956 Krilanovich ................... 254/124
3,596,982 A * 8/1971 Grams ............................ 297/71

(Continued)

FOREIGN PATENT DOCUMENTS

| DE | 33 29 900 C2 | 2/1993 |
| DE | 43 36 854 A1 | 5/1995 |

(Continued)

OTHER PUBLICATIONS

International Search Report and Written Opinion (Application No. PCT/EP2012/003428) dated Dec. 14, 2012.
German Search Report (Application No. 10 2011 118 216.4) dated Sep. 26, 2012.

*Primary Examiner* — Gerald McClain
(74) *Attorney, Agent, or Firm* — Burr & Brown, PLLC

(57) ABSTRACT

The invention relates to a drive device for multiaxial transport of workpieces through successive machining stations of a machine tool, in particular of a multistage forming press, wherein the drive device comprises two gripper rails, wherein the two gripper rails are transversely displaceable independently of each other by a first transverse drive assigned to the first gripper rail and a second transverse drive assigned to the second gripper rail for the execution of a closing movement. The gripper rails are here vertically displaceable independently of each other for the execution of a lifting movement, and/or the gripper rails are longitudinally displaceable independently of each other for the execution of a transport movement.

11 Claims, 5 Drawing Sheets

(56) References Cited

U.S. PATENT DOCUMENTS

| | | | |
|---|---|---|---|
| 4,540,087 A | 9/1985 | Mizumoto | |
| 5,105,647 A | 4/1992 | Maher | |
| 5,779,025 A | 7/1998 | Dangelmayr et al. | |
| 6,029,585 A * | 2/2000 | Tabayashi | 108/145 |
| 7,134,721 B2 * | 11/2006 | Robinson | 297/284.3 |
| 7,222,832 B2 * | 5/2007 | Welker | 248/421 |
| 8,132,518 B2 * | 3/2012 | Kim et al. | 108/145 |
| 2003/0197110 A1 * | 10/2003 | Cui | 248/585 |
| 2007/0295052 A1 | 12/2007 | Nock et al. | |
| 2012/0181735 A1 * | 7/2012 | Ooe | 269/17 |

FOREIGN PATENT DOCUMENTS

| | | | | |
|---|---|---|---|---|
| DE | 196 45 792 A1 | | 5/1998 | |
| DE | 196 45 793 A1 | | 5/1998 | |
| DE | 19645792 A1 | * | 5/1998 | ............. B21D 43/05 |
| DE | 19645793 A1 | * | 5/1998 | ............. B21D 43/05 |
| DE | 199 14 652 C1 | | 11/2000 | |
| EP | 0 701 872 A1 | | 3/1996 | |
| JP | 01-166834 A1 | | 6/1989 | |
| WO | 2005/110641 A1 | | 11/2005 | |

* cited by examiner

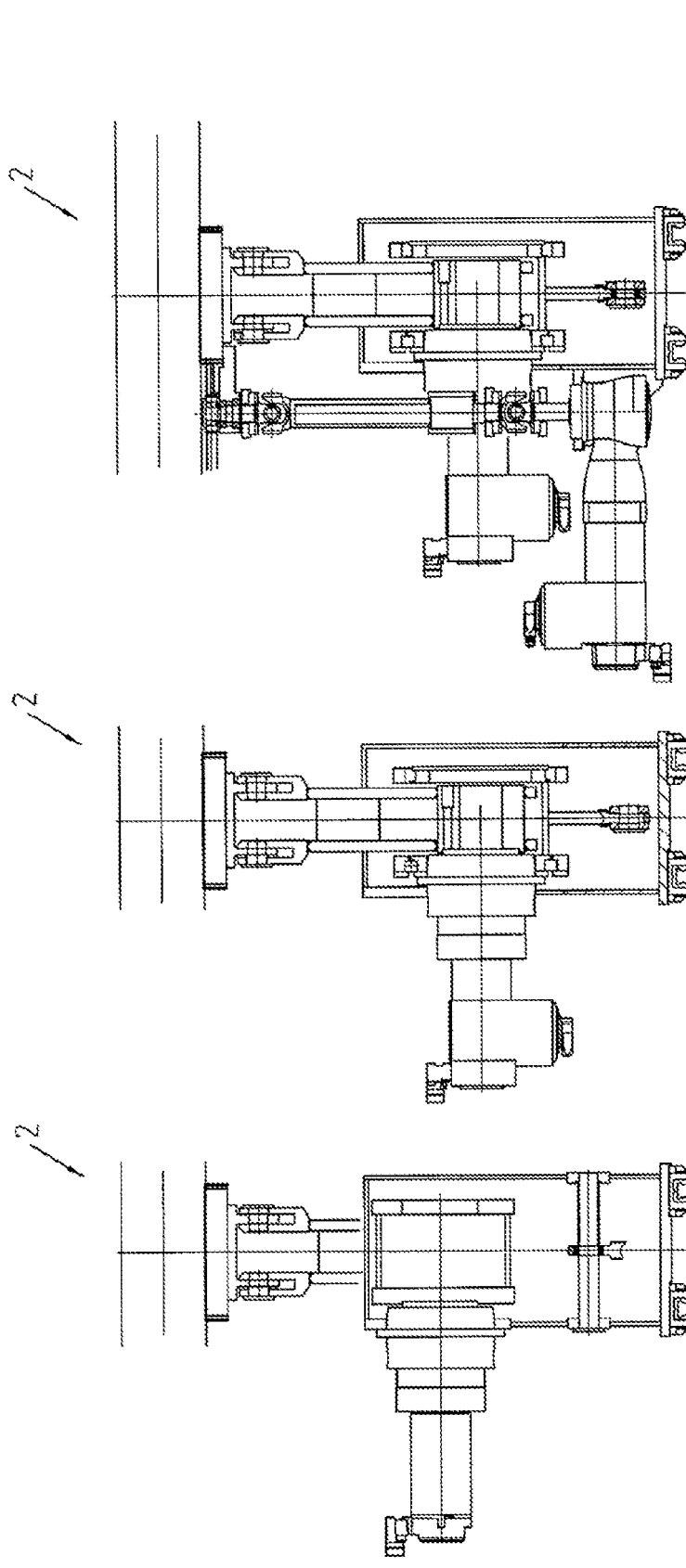

DRIVE DEVICE FOR MULTIAXIAL TRANSPORT OF WORKPIECES THROUGH SUCCESSIVE MACHINING STATIONS OF A MACHINE TOOL WITH PARALLELOGRAM GUIDES

CROSS REFERENCE TO RELATED APPLICATIONS

This application is a continuation of International Application No. PCT/EP2012/003428 filed Aug. 10, 2012, which designated the United States, and claims the benefit under 35 USC §119(a)-(d) of German Application No. 10 2011 118 216.4 filed Nov. 11, 2011, the entireties of which are incorporated herein by reference.

FIELD OF THE INVENTION

The invention relates to a drive device for multiaxial transport of workpieces through successive machining stations of a machine tool.

BACKGROUND OF THE INVENTION

A drive system for the closing movement of a multiaxial transport of workpieces in a transfer press is known from DE 199 14 652 C1. In this drive system, a dedicated drive with motion transfer means is assigned to the right-hand and left-hand gripper rail, so that the gripper rails are horizontally displaceable independently of each other. For the raising and lowering of the gripper rails, the drive system has a complex lifting mechanism, which extends almost over the entire width of the drive system and drives both gripper rails. Similarly, in a longitudinal movement in the direction of transport, the two gripper rails are jointly driven.

SUMMARY OF THE INVENTION

The object of the invention is to propose a drive device for multiaxial transport of workpieces, which, despite simple structure, has increased flexibility with respect to the gripping, raising and onward transportation.

In the drive device according to the invention, the gripper rails are vertically displaceable independently of each other for the execution of a lifting movement, and/or the gripper rails are longitudinally displaceable independently of each other for the execution of a transport movement. With a drive device of this type, it is possible, for example, to raise a workpiece slightly in the lifting movement initially with a gripper rail so as to be able with lower force expenditure to surmount the adhesion forces which the workpiece has to a bottom part of the press, for example. With a drive device of this type, it is possible, for example, to easily adjust a workpiece, in terms of its position, in the course of the transport movement, by displacing one gripper rail in relation to the other gripper rail by a greater path distance longitudinally in the direction of transport. The centerpiece of the invention is thus an increase in flexibility of the drive device, so that the latter, where necessary, is available for extended handling tasks.

In addition, the invention provides to equip the drive device with a first vertical drive, assigned to the first gripper rail, and a second vertical drive, assigned to the second gripper rail, by which the gripper rails are vertically displaceable independently of each other for the execution of the lifting movement, wherein the first vertical drive comprises, in particular, a first parallelogram guide and wherein the second vertical drive comprises, in particular, a second parallelogram guide. Through the use of two vertical drives, an independent lifting movement is technically easily realizable, wherein a lifting movement can be realized with technically simple means via a parallelogram guide.

The invention also provides to equip the drive device with a first longitudinal drive, assigned to the first gripper rail, and a second longitudinal drive, assigned to the second gripper rail, by which the gripper rails are longitudinally displaceable independently of each other for the execution of the transport movement, wherein the longitudinal drives comprise, in particular, respectively a first universal joint, a telescopic splined shaft, a second universal joint and a gear mechanism. Through the use of standardized components of this type, an independent transport movement is technically easily realizable.

In addition, the invention provides that also the two transverse drives respectively comprise a parallelogram guide. As a result, the transport drives too are constructed in a cost-effective and technically simple manner.

For the linkage of the vertical movement and the transverse movement, it is provided that the first vertical drive bears the first transverse drive and the second vertical drive bears the second transverse drive, or that the first transverse drive bears the first vertical drive and the second transverse drive bears the second vertical drive. A compact and simple construction, in which similar components can find multiple application, is hereby achieved.

The invention also provides to equip the lower parallelogram guide with a lower bearing arm having two fixed pivot points, a connecting branch having two hinge points, and two parallel running connecting elements, wherein the first connecting element is articulately fastened to the pivot point and to the hinge point and wherein the second connecting element is articulately fastened to the pivot point and to the hinge point, just as the invention provides to equip the upper parallelogram guide with a lower bearing arm having two fixed pivot points, a connecting branch having two hinge points, and two parallel running connecting elements, wherein the first connecting element is articulately fastened to the pivot point and to the hinge point and wherein the second connecting element is articulately fastened to the pivot point and to the hinge point. A compact and simple structure, in which similar components can find multiple application, is likewise hereby achieved.

In addition, it is provided according to the invention to configure the connecting branch of the lower parallelogram guide as a coupling lever, wherein the fixed pivot points of the upper parallelogram guide are configured on the coupling lever, wherein a first lever arm of the coupling lever forms the connecting branch of the lower parallelogram guide, wherein a second lever arm of the coupling lever forms the lower bearing arm of the upper parallelogram guide, and wherein, in particular, one of the hinge points of the lower parallelogram guide and one of the pivot points of the upper parallelogram guide lie on a common rotational axis. Through such a linkage of the lower parallelogram guide and the upper parallelogram guide, a particularly compact structure of the drive device is achieved.

The invention also provides to design the gripper rail such that it is displaceable relative to a gripper rail guide, wherein the connecting branch of the upper parallelogram guide is connected, in particular, to the gripper rail guide or is formed, in particular, by the gripper rail guide. A compact structure of the drive device is also hereby achieved.

The invention also provides to form the drive device substantially by a first drive unit and a second drive unit, wherein the first drive unit comprises the transverse drive, the vertical drive and the longitudinal drive of the first gripper rail and wherein the second drive unit comprises the transverse drive, the vertical drive and the longitudinal drive of the second gripper rail. A symmetrical, in particular mirror-symmetrical structure of the drive device is hereby ensured, so that a same component can find multiple application.

According to the invention, it is provided to equip the transverse drive with a first motor, which is configured, in particular, as an electric motor, wherein this motor, in particular with its output shaft, actuates the parallelogram guide of the transverse drive, in particular in one of its pivot points, and to equip the vertical drive with a second motor, which is configured, in particular, as an electric motor, wherein this motor, in particular with its output shaft, actuates the parallelogram guide of the vertical drive, in particular in one of its pivot points. Through this type of direct connection of the motors to the parallelogram guides, a compact structure is ensured.

In addition, the invention provides to equip the longitudinal drive with a third motor, which is configured, in particular, as an electric motor, wherein the gripper rail is displaceable, in particular relative to the gripper rail guide, by the third motor in the longitudinal direction. As a result, a compact and simple structure is likewise achieved.

According to the invention, it is additionally provided to connect the third motor fixedly to a first beam of the drive device, wherein an output shaft of the first motor drives via the first universal joint the telescopic splined shaft, and via the second universal joint the gripper rail, with the interposition of the gear mechanism. As a result of such a structure, the moved masses are kept small and high accelerations can be realized in a simple manner with small motor power.

Finally, the invention provides to displace the two drive units with the respectively assigned gripper rails relative to each other in the transverse direction, by at least one further transverse drive, for the conductance of a basic adjustment. Such an arrangement makes it possible to adjust the distance between the two drive units, and thus also between the two gripper rails, so that large adjustment ranges with regard to the distance apart of the gripper rails can be realized, even if the transverse drive is dimensioned comparatively small.

Within the meaning of the invention, a motor should be understood to embrace both an electric motor and a hydraulically or pneumatically working cylinder.

BRIEF DESCRIPTION OF THE DRAWINGS

Further details of the invention are described in the drawing on the basis of schematically represented illustrative embodiments, wherein:

FIGS. 5a-5c show three side views or partially sectioned side views of the drive device shown in FIG. 4.

DETAILED DESCRIPTION OF THE INVENTION

Figure 1:
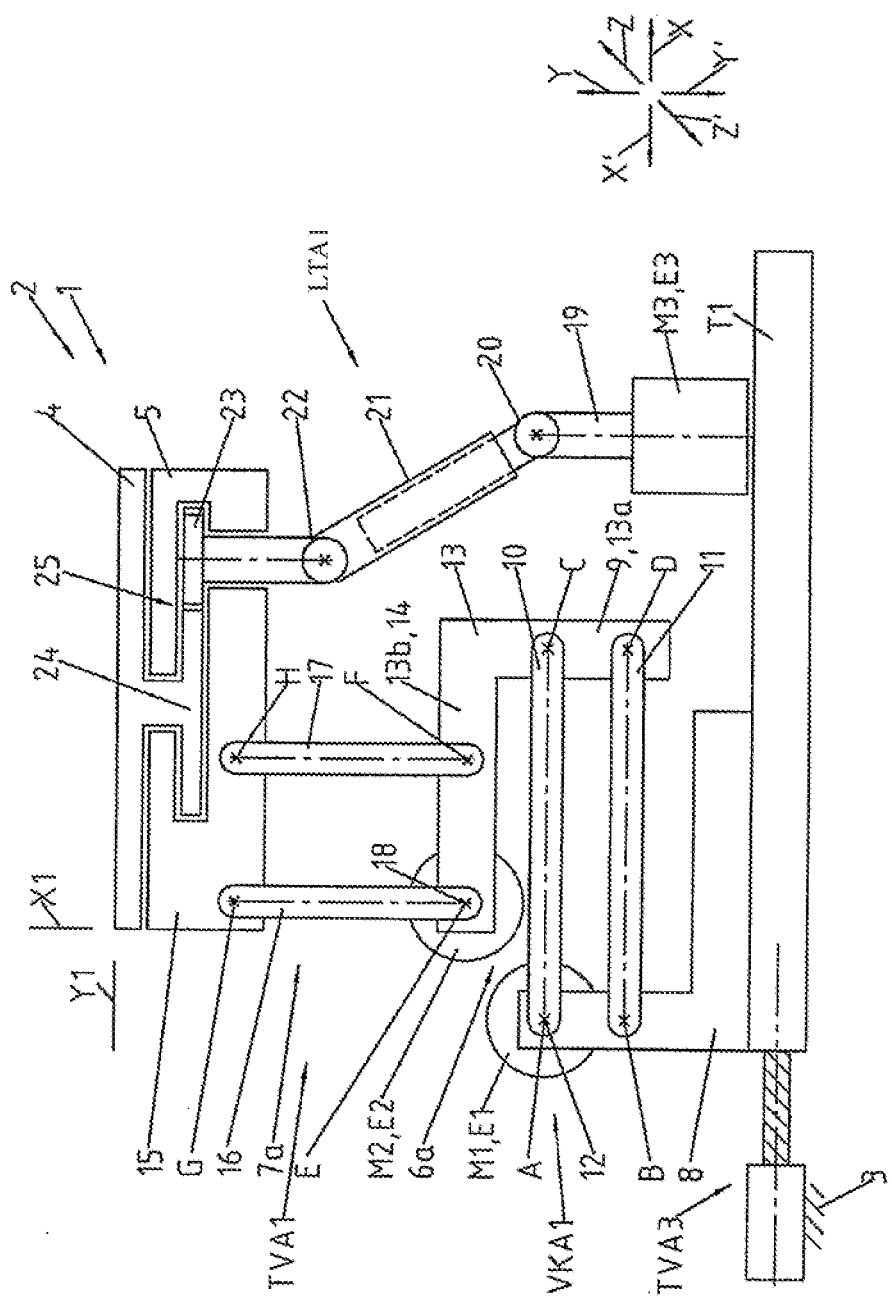
FIG. 1 shows a first drive unit of a drive device according to the invention in a first setting.

In FIG. 1 is shown, in schematic view, a first drive unit 1 of a drive device 2. The first drive unit 1 comprises a first transverse drive TVA1, a first vertical drive VKA1 and a first longitudinal drive LTA1. These drives TVA1, VKA1 and LTA1 are disposed on a beam T1. The first drive unit 1 additionally comprises a further transverse drive TVA3, which is fixedly connected to a base surface 3 and by which the beam T1 is displaceable on the base surface 3 in the x or x' direction. The drive unit 1 comprises a first gripper rail 4, which, for the onward transport of workpieces in the arrow direction z or z', is displaceable by the first longitudinal drive LTA1 in a gripper rail guide 5. The gripper rail 4 is displaceable by the first transverse drive TVA1 to the right or left in the x or x' direction, and the gripper rail 4 is displaceable by the vertical drive VKA1 upward or downward in the y or y' direction. The first vertical guide VKA1 here comprises a first, lower parallelogram guide 6a, and the first transverse guide TVA1 comprises a second, upper parallelogram guide 7a. The first, lower parallelogram guide 6a comprises a lower bearing arm 8 having two fixed pivot points A, B, a connecting branch 9 having two hinge points C, D, and two parallel running connecting elements 10, 11. The first connecting element 10 here connects the pivot point A to the hinge point C, and the second connecting element 11 connects the pivot point B to the hinge point D. The first vertical guide VKA1 further comprises a motor M1, which is flange-connected to the bearing arm 8, is configured as an electric motor E1 and, with its drive shaft 12, rotates the connecting element 10 about the pivot point A in order to raise the gripper rail 4 from a y position Y1 (see FIG. 1) to a y position Y2 (see FIG. 2). To this end, the connecting element 10 is rotated out of its horizontal setting shown in FIG. 1, through an angle α, into a setting shown in FIG. 2. The connecting branch 9, which is configured as a coupling lever 13 and comprises a first lever arm 13a and a second lever arm 13b, is raised by the parallelogram guide 6a, wherein the first lever arm 13a is formed by the connecting branch 9 and wherein the second lever arm 13b forms a lower bearing arm 14 of the second, upper parallelogram guide 7a. As a result of the one-piece construction of the connecting branch 9 of the first vertical drive VKA1 and of the lower bearing arm 14 of the first transverse drive TVA1, the first transverse drive TVA1 is raised by the vertical drive VKA1, so that the transverse drive TVA1 disposed between the gripper rail 4 and the vertical drive VKA1 joins in all lifting and lowering movements of the vertical drive VKA1. The transverse drive TVA1 comprises, in addition to the aforementioned lower bearing arm 14, a connecting branch 15 and two connecting elements 16, 17, pivot points E, F and hinge points G, H. The two connecting elements 16, 17 here connect the bearing arm 14 and the connecting branch 15 at the points E and G, as well as F and H. The first transverse drive TVA1 further comprises a motor M2, which is flange-connected to the bearing arm 14, is configured as an electric motor E2, and, with its drive shaft 18, rotates the connecting element 16 about the pivot point E in order to shift the gripper rail 4 from an x position X1 (see FIG. 1) to an x position X2 (see FIG. 2) in the arrow direction x. To this end, the connecting element 16 is rotated out of its vertical setting shown in FIG. 1, through an angle β, into a setting shown in FIG. 2. The connecting branch 15 is formed by the gripper rail guide 5. The first longitudinal drive LTA1 comprises a motor M3, which is configured as an electric motor E3 and, via its drive shaft 19 and a universal joint 20 connected thereto, drives a telescopic splined shaft 21, wherein the telescopic splined shaft 21, via a further universal joint 22, drives a pinion 23, which is mounted in the gripper rail guide 5 and, together with the gripper rail 4 configured as a toothed rack 24, forms a gear mechanism 25. By a rotation of the pinion 23 acting on the toothed rack 24, the gripper rail 4 is displaceable in the z or z' direction. The motor M3 is fixedly disposed on the beam T1. The telescopic splined shaft 21 and the two universal joints 20 and 22 enable the toothed rack 24 configured on the gripper rail 4 to be drivable by the first longitudinal drive LTA1 irrespective of the x position and y position of the gripper rail guide 5 or gripper rail 4. When comparing FIGS. 1 and 2, it can be seen how the first longitudinal drive LTA1 drives the gripper rail 4 in its position X1, Y1 and in its position X2, Y2.

Figure 2:
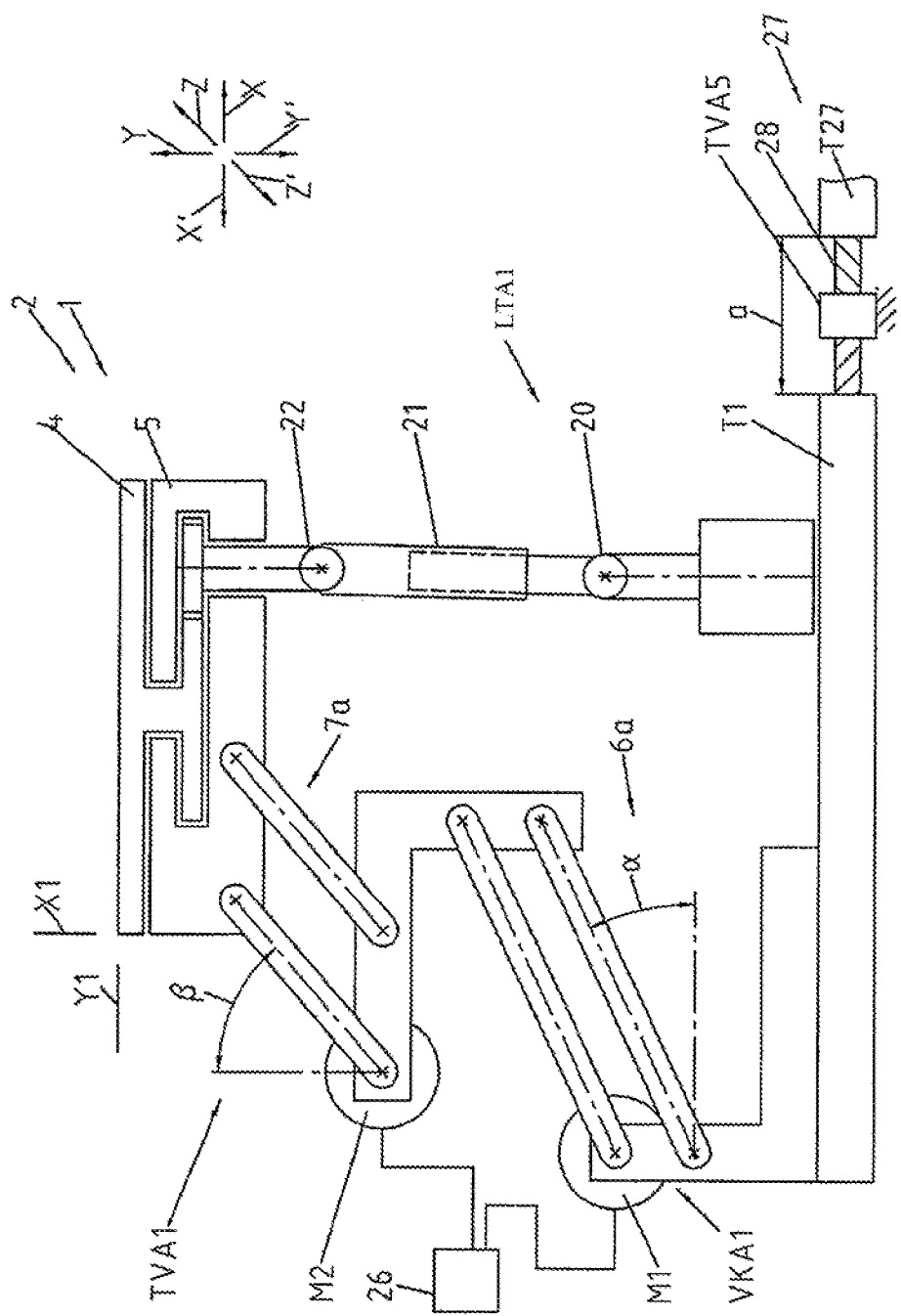
FIG. 2 shows the first drive unit, shown in FIG. 1, in a second setting.

As already mentioned, FIG. 2 shows the first drive unit 1 of the drive device 2 in that position X2, Y2 of its gripper rail 4 which, starting from the position X1, Y1 shown in FIG. 1, has been reached by a lifting movement of the first vertical drive VKA1 and a transverse movement of the first transverse drive TVA1. The first longitudinal drive LTA1 here passively follows the predefined position, in that the angular settings of the universal joints 20, 22 and the length of the telescopic splined shaft 21 are adapted or positionally adjusted to the setting of the gripper rail guide 5 or of the gripper rail 4. The drive device 2 also comprises an electronic control device 26, shown in FIG. 2, which controls or regulates the motors M1 and M2 of the first vertical drive VKA1 and of the first transverse drive TVA1 such that the desired x position and y position, despite a superimposition of the two drives, are reached precisely and directly. At variance with the representation of FIG. 1, FIG. 2 shows, alternatively to the third transverse drive TVA3, which moves the beam T1, a fifth transverse drive TVA5, to which both the described first drive unit 1 and a hitherto unshown second drive unit 27 are connected, of which latter, in FIG. 2, only a beam T27 is rudimentarily shown. The fifth transverse drive TVA5 comprises a spindle 28, by whose rotation a distance a between the first drive unit 1 and the second drive unit 27 can be increased or reduced, wherein the spindle 28 is guided in the beams T1 and T27 in spindle nuts (not represented).

Figure 3:
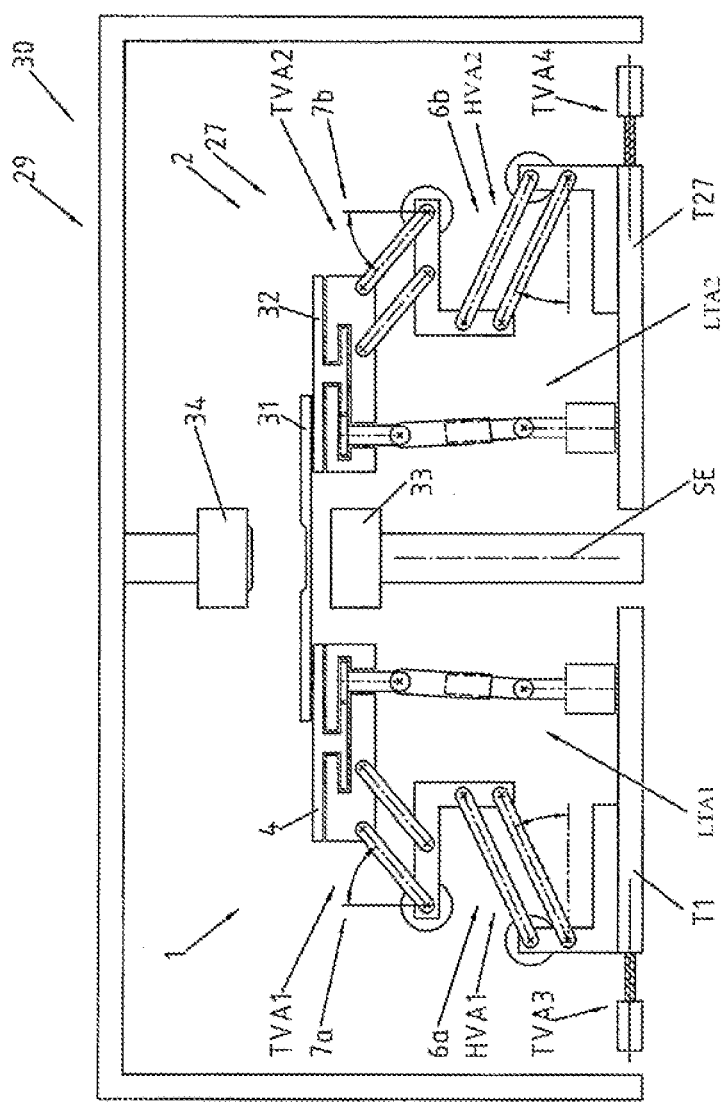
FIG. 3 shows the first drive unit, known from FIGS. 1 and 2, together with a second drive unit constructed in mirror symmetry, wherein a machining station of a forming press, through which a workpiece is transported by the drive device, is additionally shown.

In FIG. 3, the drive device 2 according to the invention is shown in full. This substantially comprises the first drive unit 1, shown in FIGS. 1 and 2, and the second drive unit 27, already shown rudimentarily in FIG. 2, wherein the drive unit 27 is configured, in relation to a mirror plane SE running perpendicularly into the drawing plane, substantially mirror-symmetrically to the first drive unit 1 and comprises a second transverse drive TVA2, a second vertical drive VKA2, and a second longitudinal drive LTA2. The second vertical drive VKA2 here comprises a further, lower parallelogram guide 6b, and the second vertical drive VKA2 comprises a further, upper parallelogram guide 7b. In accordance with the embodiment shown in FIG. 1, the second drive unit 27 comprises a fourth transverse drive TVA4, which is connected to the beam T27. FIG. 3 shows, in addition to the drive device 2 having the drive units 1 and 27, a machining station 29 of a multistage forming press 30, in which precisely one workpiece 31 is transported by the drive device 2 with its gripper rails 4 and 32. The machining station 29 comprises a bottom tool 33 and a top tool 34. In a step following on from the representation, the workpiece 33 is deposited by the drive device 2 on the bottom tool 33 and, in a further step, is deep-drawn by the top tool 34.

Figure 4:
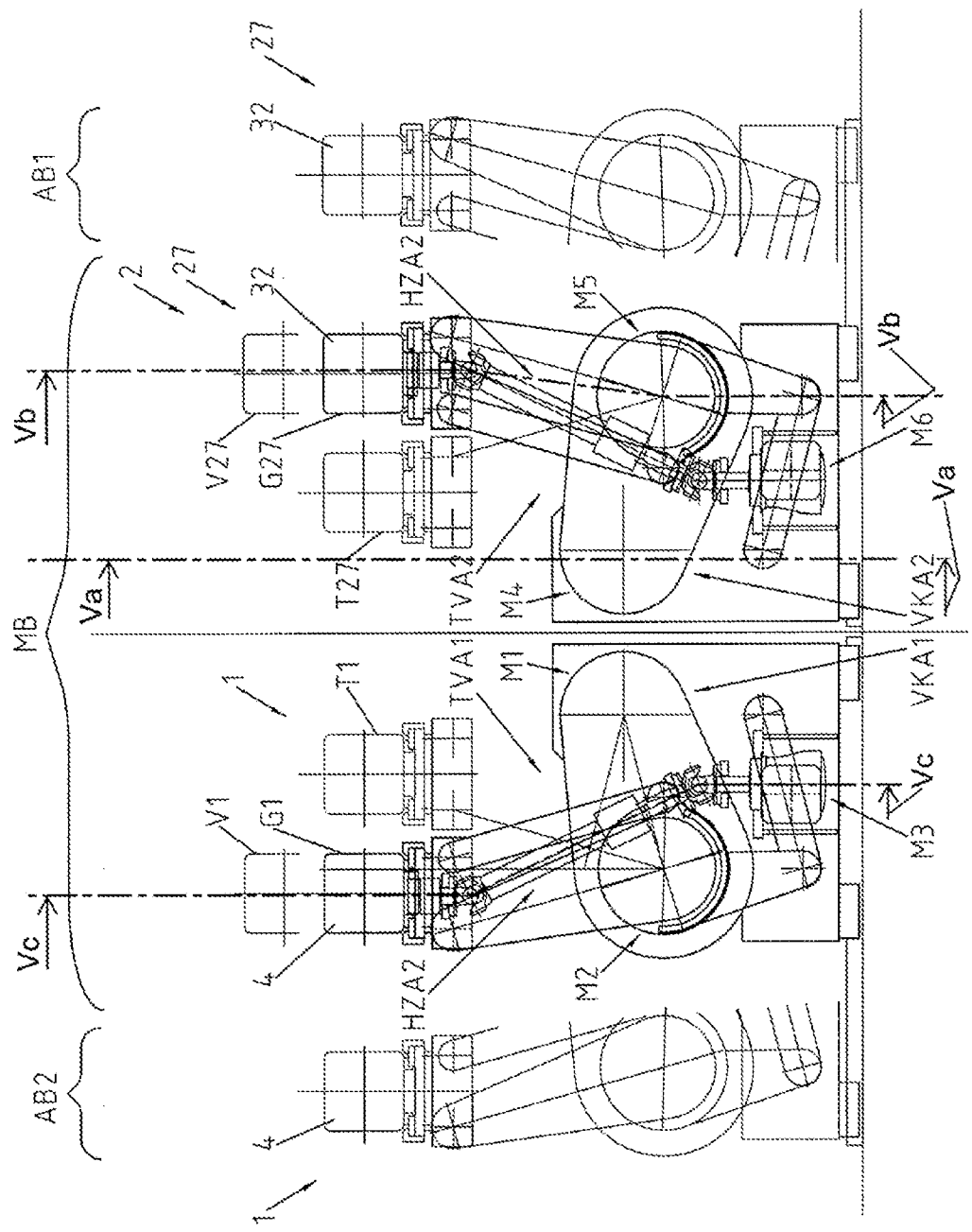
FIG. 4 shows, in analogy to FIG. 3, the structural design of the two drive units of a drive device according to the invention.

In FIG. 4, in analogy to FIG. 3, the structural design construction of an inventive drive device 2 having two drive units 1, 27 is shown. The two drive units 1, 27 are here represented in a middle region MB of FIG. 4 in a closely converged setting, and in outer regions AB1 and AB2 are shown in partial representation in a widely diverged setting. In the middle region MB of FIG. 4, a first and a second transverse drive TVA1, TVA2, a first and a second vertical drive VKA1, VKA2, and a first and a second longitudinal drive LTA1, LTA2, as well as motors M1 to M6, are discernible. In addition, gripper rails 4, 32 of the two drive units 1, 27 are shown by way of example in a basic setting G1, G27, a raised setting V1, V27, and a laterally displaced setting T1, T27.

In FIGS. 5a to 5c, side views or partially sectioned side views of the drive device 2 represented in FIG. 4 are shown.

The invention is not limited to represented or described illustrative embodiments, but rather embraces refinements of the invention within the scope of the patent claims.

REFERENCE SYMBOL LIST 1 first drive unit of 2
2 drive device
3 base surface
4 first gripper rail
5 gripper rail guide
6a first, lower parallelogram guide
6b further, lower parallelogram guide
7a further, upper parallelogram guide
7b further, upper parallelogram guide
8 lower bearing arm of 6a
9 connecting branch of 6a
10 connecting element of 6a
11 connecting element of 6a
12 drive shaft of E1
13 coupling lever
13a first lever arm of 13
13b second lever arm of 13
14 lower bearing arm of 7a
15 connecting branch of 7a
16 connecting element of 7a
17 connecting element of 7a
18 drive shaft of E2
19 drive shaft of LTA1
20 universal joint of HZA 1
21 telescopic splined shaft of LTA1
22 universal joint of LTA1
23 pinion of LTA1
24 toothed rack
25 gear mechanism consisting of 23 and 24
26 electronic control unit
27 second drive unit of 2
28 spindle of TVA5
29 machining station
30 multistage forming press
31 workpiece
32 second gripper rail
33 bottom tool
34 top tool
A, B pivot point of 6a
C, D hinge point of 6a
E, F pivot point of 7a
G, H hinge point of 7a
a distance between T1 and T27
E1-E3 electric motor
G1, G27 basic setting G1, G27 of 4 and 32
LTA1 first longitudinal drive
LTA2 second longitudinal drive
M1 motor of VKA1
M2 motor of TVA1
M3 motor of LTA1
M4 motor of VKA2
M5 motor of TVA2
M6 motor of LTA2
MB middle region of FIG. 4
AB1, AB2 outer region of FIG. 4
SE mirror plane T1 beam of 1
T27 beam of 27
TVA1 first transverse drive
TVA2 second transverse drive
TVA3 third transverse drive
TVA4 fourth transverse drive
TVA5 fifth transverse drive
T1, T27 laterally displaced setting of 4 and 32
VKA1 first vertical drive
VKA2 second vertical drive
V1, V27 raised setting of 4 and 32
X1, X2 x position
x, x' direction
Y1, Y2 y position
y, y' direction
z, z' direction
α, β angle

The invention claimed is:

1. A drive device for multiaxial transport of workpieces through successive machining stations of a machine tool, comprising two gripper rails that are transversely displaceable independently of each other by a first transverse drive assigned to the first gripper rail and a second transverse drive assigned to the second gripper rail for the execution of a closing movement, wherein the gripper rails are at least one of (i) vertically displaceable independently of each other for the execution of a lifting movement, and (ii) longitudinally displaceable independently of each other for the execution of a transport movement,
 wherein the drive device comprises a first vertical drive assigned to the first gripper rail, and a second vertical drive assigned to the second gripper rail, by which the gripper rails are vertically displaceable independently of each other for the execution of the lifting movement, wherein the first vertical drive comprises a first parallelogram guide and wherein the second vertical drive comprises a further parallelogram guide,
 wherein the drive device comprises a first longitudinal drive assigned to the first gripper rail, and a second longitudinal drive assigned to the second gripper rail, by which the gripper rails are longitudinally displaceable independently of each other for the execution of the transport movement, wherein the longitudinal drives comprise respectively a first universal joint, a telescopic splined shaft, a second universal joint and a gear mechanism, and
 wherein the first transverse drive comprises a first parallelogram guide, and the second transverse drive comprises a second parallelogram guide.

2. The drive device as claimed in claim 1, wherein a first drive unit comprises the transverse drive, the vertical drive and the longitudinal drive of the first gripper rail, and a second drive unit comprises the transverse drive, the vertical drive and the longitudinal drive of the second gripper rail.

3. The drive device as claimed in claim 2, wherein the two drive units with the respectively assigned gripper rails are displaceable relative to each other in the transverse direction, by at least one further transverse drive, for the conductance of a basic adjustment.

4. The drive device as claimed in claim 1, wherein the transverse drives comprise an electric motor having an output shaft that actuates the first parallelogram guide of the first transverse drive at one of its pivot points E and F, and wherein the vertical drive comprises an electric motor having an output shaft that actuates the first parallelogram guide of the first vertical drive at one of its pivot points A and B.

5. The drive device as claimed in claim 1, wherein the first vertical drive bears the first transverse drive and the second vertical drive bears the second transverse drive.

6. The drive device as claimed in claim 1, wherein the first transverse drive bears the first vertical drive and the second transverse drive bears the second vertical drive.

7. The drive device as claimed in claim 1, wherein the first parallelogram guide of the first vertical drive comprises a lower bearing arm having two fixed pivot points, A and B, a connecting branch having two hinge points, C and D, and two parallel running connecting elements,
 wherein a first connecting element is articulately fastened to pivot point A and to hinge point C, and
 wherein a second connecting element is articulately fastened to pivot point B and to hinge point D,
 wherein the first parallelogram guide of the first transverse drive comprises a lower bearing arm having two fixed pivot points E and F, a connecting branch having two hinge points G and H, two parallel running connecting elements,
 wherein the first connecting element is articulately fastened to pivot point E and to hinge point G, and
 wherein the second connecting element is articulately fastened to pivot point F and to hinge point H.

8. The drive device as claimed in claim 7, wherein the connecting branch of the first parallelogram guide of the first vertical drive is configured as a coupling lever,
 wherein the fixed pivot points E and F are configured on the coupling lever,
 wherein a first lever arm of the coupling lever forms the connecting branch of the first parallelogram guide of the first vertical drive,
 wherein a second lever arm of the coupling lever forms the lower bearing arm of the first parallelogram guide of the first transverse drive, and
 wherein one of the hinge points C and D of the first parallelogram guide of the first vertical drive and one of the pivot points E and F of the first parallelogram guide of the first transverse drive lie on a common rotational structure.

9. The drive device as claimed in claim 7, wherein the gripper rail is displaceable relative to a gripper rail guide, wherein the connecting branch of the first parallelogram guide of the first transverse drive is connected to the gripper rail guide or is formed by the gripper rail guide.

10. The drive device as claimed in claim 9, wherein the first longitudinal drive comprises an electric motor, wherein the gripper rail is displaceable relative to the gripper rail guide by the electric motor in the longitudinal direction.

11. The drive device as claimed in claim 10, wherein the electric motor of the first longitudinal drive is fixedly connected to a first beam of the drive device, wherein an output shaft of the electric motor of the vertical drive drives via the first universal joint the telescopic splined shaft, and via the second universal joint the gripper rail, with the interposition of the gear mechanism.

* * * * *